United States Patent [19]
Marks et al.

[11] Patent Number: 5,389,187
[45] Date of Patent: Feb. 14, 1995

[54] APPARATUS FOR TIRE TREAD APPLICATION

[75] Inventors: Patrick D. Marks, Cuyahoga Falls; Michael W. Smith, Mogadore, both of Ohio

[73] Assignee: The Goodyear Tire & Rubber Company, Akron, Ohio

[21] Appl. No.: 85,306

[22] Filed: Jun. 30, 1993

[51] Int. Cl.⁶ ............................................. B29D 30/30
[52] U.S. Cl. ................... 156/405.1; 156/130
[58] Field of Search ............... 156/405.1, 406.4, 406.6, 156/130; 226/199; 193/35 C; 198/836.3

[56] References Cited

U.S. PATENT DOCUMENTS

| | | | |
|---|---|---|---|
| 2,815,111 | 12/1957 | Capps et al. | 193/35 C |
| 3,393,112 | 7/1968 | Brown | 156/405.1 |
| 3,413,174 | 11/1968 | Porter | 156/405.1 |
| 4,049,486 | 9/1977 | Henley | 156/405.1 |
| 4,961,813 | 10/1990 | Bailey | 156/406.4 |

*Primary Examiner*—Geoffrey L. Knable
*Attorney, Agent, or Firm*—Frederick K. Lacher; T. P. Lewandowski

[57] ABSTRACT

A method an apparatus of applying a tire tread to a tire carcass including the steps of conveying a tread on a conveyor between two self-centering guides which are slidably mounted on a frame over the conveyor, the guides having parallel rows of rollers for engaging opposite edges of the treads; adhering one end of the tread to the tire carcass on a tire building drum; rotating the tire building drum to pull the tread over the tire carcass; and applying a predetermined uniform pressure against the opposite edges of the tire tread through the rollers to uniformly resist movement of the tread toward the tire building drum and thereby uniformly stretch the tread. The apparatus includes the use of a pneumatic piston cylinder which urges the rollers against the edges of the tread, applying uniform force perpendicular to the tread's axis regardless of the width or width variations of the tread.

4 Claims, 3 Drawing Sheets

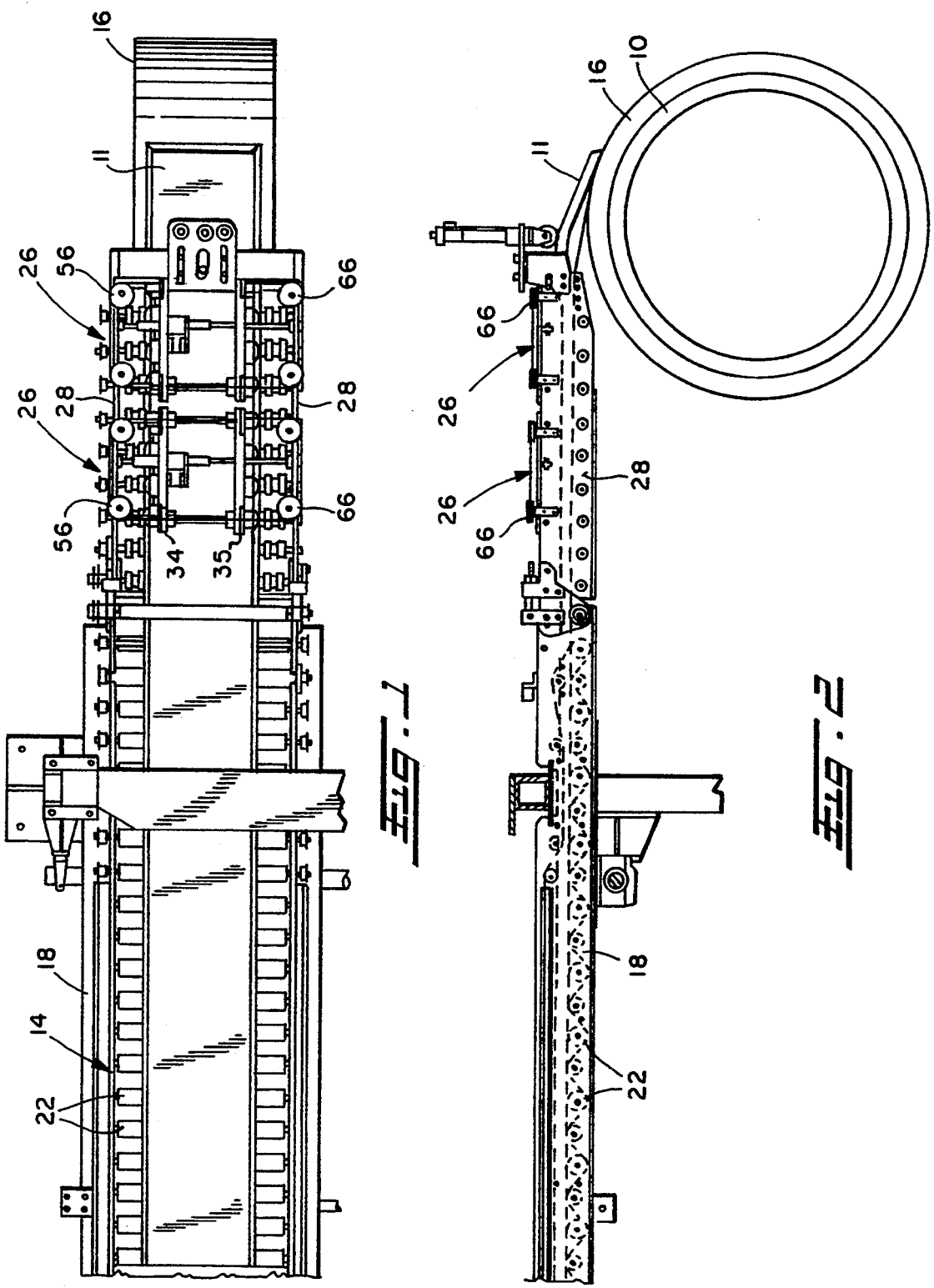

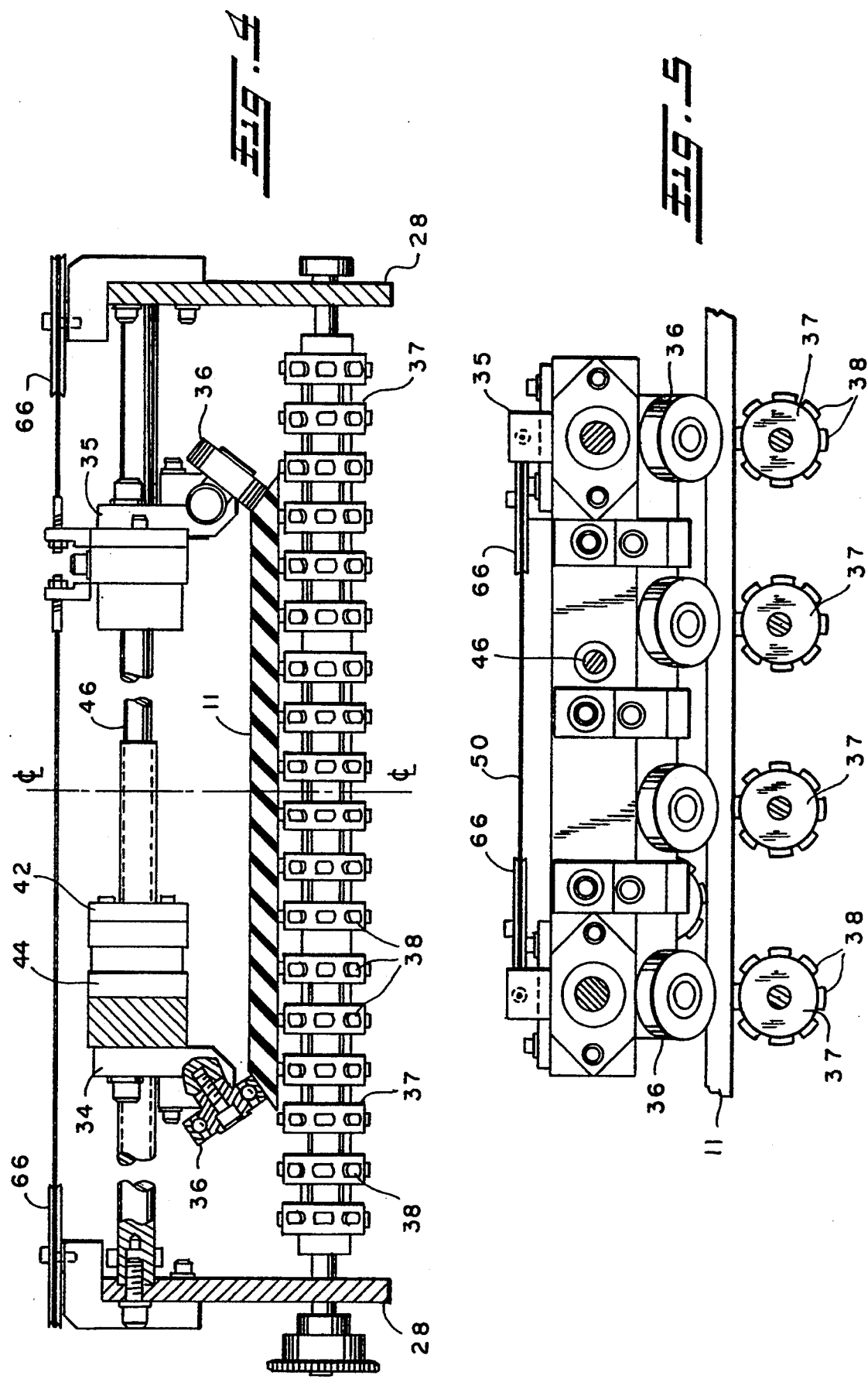

APPARATUS FOR TIRE TREAD APPLICATION

This invention relates to a method and apparatus of applying an unvulcanized tire tread to an unvulcanized tire carcass during the tire building process. In the manufacture of radial tires, it is preferable that the tread be slightly stretched during the application of the tread to the tire carcass. It is important to control the stretch in the flat slab of extruded green tire tread as it is applied to the cylindrical tire carcass. Uniform stretching of the tread is essential for bending the flat tread and adhering it properly to the curved surface of the green tire carcass. If the tread is stretched too little, it will not reach completely around the tire and if the tread is stretched too much, the tread will be too long, creating an undesired overlap. Both of these discrepancies may cause poor tire performance. Discrepancies in length can be adjusted by the operator in some cases but this is not desirable.

In accordance with one aspect of the invention there is provided a method of applying a tire tread to a tire carcass which includes the steps of:
 (a) supporting the tread on a conveyor between two self-centering guides slidably mounted on a frame over the conveyor. The guides have rollers for engaging opposite edges of the tread;
 (b) adhering one end of the tread to the tire carcass on a tire building drum;
 (c) rotating the tire building drum to pull the tread over the tire carcass; and,
 (d) applying a predetermined uniform pressure against the opposite edges of the tread with the rollers to uniformly resist movement of the tread towards the tire building drum and thereby uniformly stretch the tread.

In accordance with another aspect of the invention there is provided a method of uniformly stretching a tread along its length, the method comprising the steps of:
 (a) loading the tread between pairs of opposed pressure means for applying force generally perpendicularly to edges of the tread;
 (b) urging the pressure means against the edges of the tread;
 (c) conveying the tread through the pressure means; and,
 (d) adjusting the force applied by the pressure means so that constant force is applied to the edges of the tread to uniformly resist movement of the tread through the pressure means.

In accordance with still another aspect of the invention there is provided apparatus for uniformly stretching an unvulcanized tire tread during its application to a tire carcass, the tread having a length, edges and ends, the apparatus comprising a tire building drum for supporting a tire carcass on the drum, pressure means for applying force against the edges of the tread and a pneumatic piston cylinder assembly for urging the pressure means against the edges of the tread with constant force at each side point of the tread regardless of variation in the width of the tread.

IN THE DRAWINGS

FIG. 1 is a fragmentary plan view of the tire building apparatus embodying the invention and more specifically shows the location of the inventive mechanism in relation to the conveyor and tire building drum and the tread being fed to the drum.

FIG. 2 is a side elevational view of the tire building apparatus of FIG. 1, more specifically showing the location of the inventive mechanism in relation to the conveyor and tire building drum.

FIG. 4 is an end view looking along an axis of a tire tread as shown in FIG. 3 and taken along line 4—4, showing the tire tread on the conveyor and between the guides of the invention.

FIG. 5 is a side view of the tire tread and apparatus of FIG. 3 taken along line 5—5 in FIG. 3.

DETAILED DESCRIPTION OF THE PREFERRED EMBODIMENT

Figure 3:
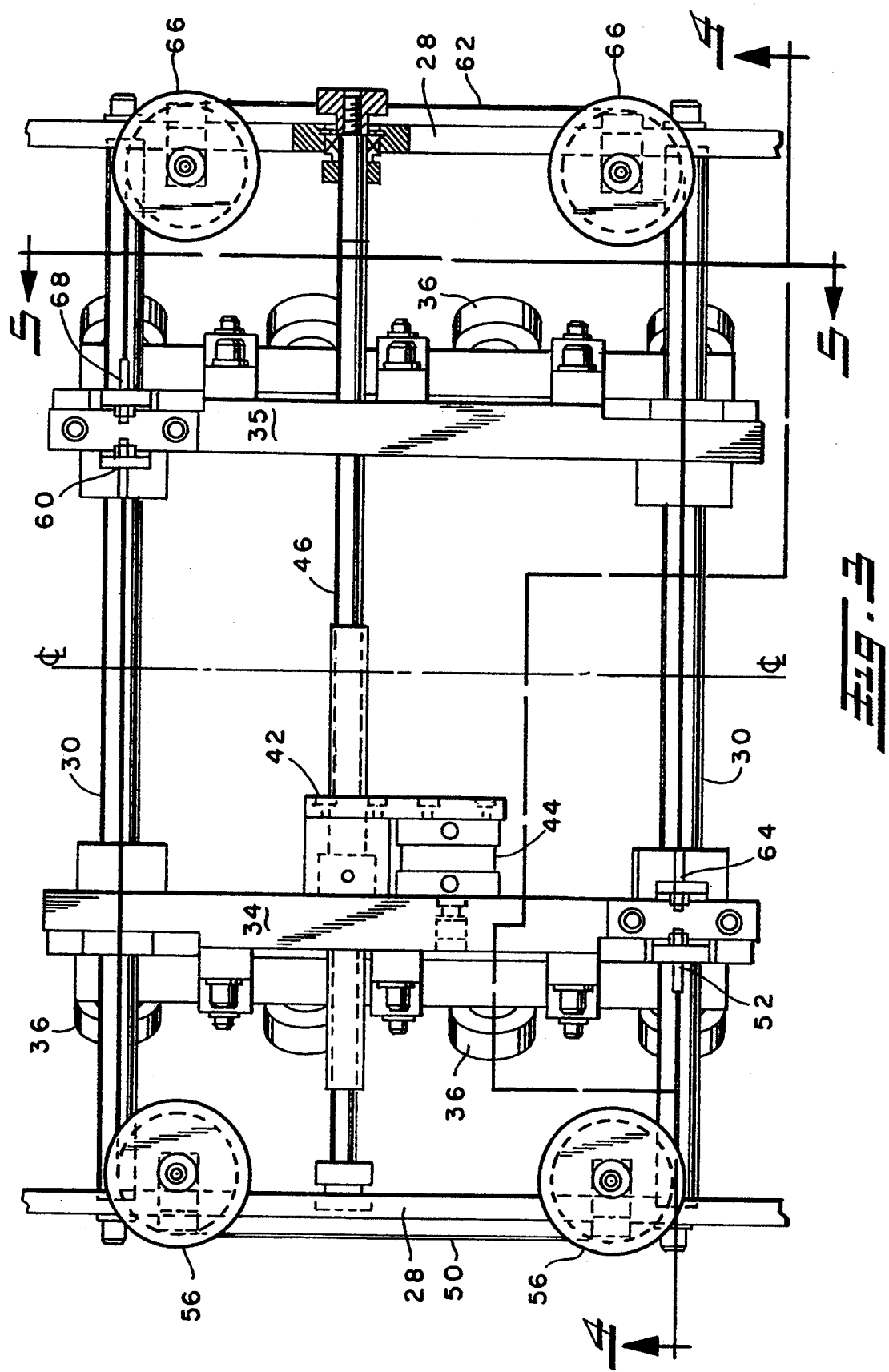
FIG. 3 is an enlarged view of the tread centering apparatus and constant pressure guiding mechanism with the tread and conveyor deleted.

With reference to FIGS. 1 and 2, a tire building drum 10 is shown which is usually served by a number of mechanisms which deliver various tire components to the building drum for assembly into the finished green tire product. A tire tread 11 is a major component of the tire which needs to be supplied to the tire building drum 10. Due to the tread's large size and weight, mechanisms for supplying the tread 11 to the tire building drum 10 must be structurally stable. In addition, the tire tread 11 has a significant impact on the tire's performance. As such, it is important that the tread 11 be precisely delivered to the tire building drum 10, centered accurately on a tire carcass 16, and uniformly applied to the tire carcass to obtain optimum tire performance.

With continuing reference to FIGS. 1 and 2, the embodiment shown utilizes a conveyor 14 to support the tread 11 prior to its application to the tire carcass 16. The conveyor 14 is made up of a series of rollers 22 which are mounted on a frame 18. The rollers 22 carry the tread 11 supported thereon toward the tire building drum 10. The conveyor 14 may be driven to feed the tread 11 to the drum 10 at a predetermined speed which is less than the speed at which the drum is driven to impart stretch to the tread. Various forms of supplying the green, unvulcanized tread 11 to the tire building machine can be used.

At the tire building drum 10, there is typically a mechanism to indicate the center of the tire building drum 10. The tire carcass 16 and other components are measured from this center point. Similarly, the tire tread 11 is marked with a centerline and the tire tread is ideally placed onto the tire carcass 16 so that the tread centerline is coincident with the centerline of the tire and of the building drum 10. Because of the importance of properly centering the tread 11 onto the tire carcass 16, various mechanisms have been utilized to guide the tread and properly center it on the tire carcass during the tire building process. Various guides have been used which contact the edges of the tread and assist in keeping the tread aligned properly.

Another objective in the tread application process is to control the stretch of the tread 11 as it is applied to the tire carcass 16. The stretching is required to properly configure the thick, flat tire tread 11 to the cylindrically-shaped tire carcass 16. It has been found that unless the tread 11 is properly stretched, it will not change its flat configuration and adhere properly to the cylindrical tire carcass. Properly stretching the tread is important. If the tread 11 is stretched too much, it will be too long for the tire carcass 16 and could cause objectionable riding and handling characteristics in the finished tire. If the tread is not stretched enough, the tread could be too short for the tire and similarly cause unacceptable performance in the finished tire. Finally, treads that are stretched to the proper length, but are stretched in a nonuniform way, thus building non-uniformities into the tread itself during the tire building process will also yield unacceptable tire performance.

Heretofore mechanisms have been used which included guides that placed pressure against the lateral edges of the tread. The pressure was generated by springs or by counter weights. Deficiencies of these designs include the difficulty in changing the force generated by the guides and transferred to the edges of the tread 11. For example, if the guides were to be opened wider than the specified guiding position to allow the tread to more easily enter the guides before applying any guiding force, the spring or counter weight system would not provide for this need. Another disadvantage was the inability to easily adjust the guiding force applied by the guides during the application of the tread and between applications.

With reference to FIGS. 3–5, the inventive centering and guiding mechanism 26 is disclosed in greater detail. A frame 28 supports linear ways 30. Slidably mounted on the ways 30 are a pair of guides 34,35. Mounted on each guide 34,35 is a series of linearly-aligned rollers 36 which are angled so that the bottom surface of the roller 36 is tilted toward the axial centerline CL of the tread 11 and parallel to the tread edges 72 and 74.

Mounted on the frame 28 are rows of driving rollers 37 having circumferentially spaced adjusting rollers 38 for allowing lateral movement of the tread 11.

The guide 34 is attached to a pneumatic double acting piston cylinder assembly 44. The phrase "double-acting" is meant to indicate that the piston cylinder assembly 44 is capable of moving inwardly or outwardly upon the application of compressed air. The piston cylinder assembly 44 is connected to a centering screw 46 by an adjustment nut 48 mounted on a plate 42 fastened to the piston cylinder assembly.

With reference to FIG. 3, a centering mechanism for the guiding mechanism 26 will be described. A first cable 50 is connected at one end 52 to guide 34. The first cable 50 extends from one end 52 around pulleys 56 to a second end 60 which is attached to guide 35.

Similarly, a second cable 62 is attached at one end 64 to guide 34, and extends around pulleys 66 to a second end 68 which is attached to guide 35. Through this arrangement, movement perpendicular to the axial centerline CL by guide 34 causes an equal and opposite movement by guide 35. In this way centering and an equal force can be supplied by the rollers 36 on each edges 72,74 of the tread 11.

The provision of a pneumatic piston cylinder 44 adds the additional advantage of accurately and adjustably applying the desired amount of force through rollers 36 to the lateral edges 72,74 of the tread 11. For example, by supplying a certain air pressure to the pneumatic piston cylinder assembly 44, the force generated by the piston 44, and transferred through the cables 50,62 will be constant, no matter how the width of the tread, i.e. the distance between edge 72 and edge 74, might vary along the length of the tread 11.

In operation, the guides 34,35 and rollers 36 are initially spread beyond the expected tread width by the double acting piston cylinder assembly 44 to allow easy insertion of the tread 11 into the mechanism 26. The centerline of the tread 11 is then aligned with the centerline of the drum 10 by closing the guides against the tread edges. The desired amount of force is applied by controlling the pressure supplied to the air piston cylinder assembly 44. In one application of the preferred embodiment, the rollers 36 of the guides 34,35 were adjusted by centering screw 46 to be 3/32 inches closer together than the actual width of the tread 11. The rollers 36 place a slight force on the edges 72,74 of the tread 11 which is directed perpendicularly to the tread centerline CL. This force slightly resisted movement by the tread 11 along its axial centerline. This slight force helped stretch the tread 11 the appropriate amount as the tread 11 was applied to the tire carcass 16. One end of the tread 11 was initially adhered to the tire carcass 16 which was on the tire building drum 10. The drum 10 was rotated thus pulling the tread 11 off the conveyor 14 and around the tire carcass 16. Due to the resistance provided by the pressure of the rollers 36, and the difference in speed of the conveyor 28 and drum 16 the tire tread 11 was slightly stretched an amount sufficient to conform the flat tread 11 to the cylindrical-shape of the tire carcass and drum 10. Stretching of the tread 11 is also provided by controlling the drive speed of conveyors 14 and 28 and the speed of rotation of the drum 16 so that the peripheral speed of the drum is greater than the speed of the conveyor. It is important however that the resistance of the guides 34,35 of the centering mechanisms provide a constant resistance to avoid variations in the stretching of the tread 11.

While a certain representative embodiment and details have been shown for the purpose of illustrating the invention, it will be apparent to those skilled in the art that various changes and modifications may be made therein without parting from the spirit or scope of the invention.

What is claimed is:

1. Apparatus for tire tread application to a tire carcass said apparatus comprising a conveyor with two guides slidably mounted on a frame over said conveyor and a tire building drum, parallel ways on said frame extending transversely of said conveyor, an adjusting screw mounted on said frame and extending transversely of said conveyor, an adjusting nut threaded on said screw, said guides being slidably mounted on said ways, a pneumatic piston cylinder assembly interposed between said adjusting nut and a first one of said guides for urging said first one of said guides towards a first edge of said tread and a self-centering mechanism connecting said first one of said guides to a second one of said guides for simultaneously urging rollers on said guides toward a second edge of said tread, said piston cylinder assembly including pressure regulating means for regulating an operating pressure of said piston cylinder assembly so that said piston cylinder assembly can apply a continuous constant force at each side of said tire tread while in contact with said tread regardless of variation in a width of said tire tread.

2. Apparatus in accordance with claim 1 wherein said conveyor is substantially horizontal and extends to a position adjacent said tire building drum.

3. Apparatus in accordance with claim 1 wherein said self-centering mechanism includes pulleys mounted on four corners of said frame, a cable disposed around said pulleys and connected to a first one of said guides at a first position between two of said pulleys and connected to a second one of said guides at a position between the other two of said pulleys so that upon movement of said first one of said guides towards one of said tread edges, the other one of said guides will be moved towards a second one of said tread edges.

4. Apparatus in accordance with claim 3 wherein said pneumatic piston cylinder assembly is in communication with a source of air pressure and a pressure regulator for controlling the pressure of said cylinder is interposed between said source of air pressure and said piston cylinder assembly.

* * * * *